United States Patent Office
3,185,914
Patented May 25, 1965

3,185,914
PARAMETRIC DEVICE FOR INCREASING FREQUENCY AND/OR POWER

John Battiscombe Gunn, Yorktown Heights, N.Y., assignor to International Business Machines Corporation, New York, N.Y., a corporation of New York
Filed Dec. 14, 1960, Ser. No. 75,866
15 Claims. (Cl. 321—69)

This invention relates to wave translating devices and more particularly to parametrically controlled devices of a type in which the output is obtained at a frequency which is higher than any input frequency applied to the system, and in which there may be an increase in power.

An object of the invention is to improve the efficiency of generation of extremely high frequency oscillations, particularly by harmonic generation.

Another object fo the invention, in certain of its embodiments, is to provide a new and improved apparatus and method for obtaining amplification of electromagnetic waves and an increase in their frequency.

Another object is to generate output waves at frequencies which are integral multiples of one-half the frequency of an input wave applied to the system, that is, waves of harmonic character but of half-integral order, as well as waves of integral order.

The natural frequency of a resonant system will generally depend on several parameters. These parameters are quantities which relate some particular mode of energy storage to a generalized displacement or velocity. If, during the free oscillation of such a system, one or more of these parameters is changed in such a sense that the natural frequency of that mode of oscillation is increased, work may be done on the system. In this way its energy content may be increased if the spontaneous decay of the oscillation due to dissipative forces does not cause a loss of energy greater than the external work done.

In explaining the term "natural frequency" it may be helpful preliminarily to consider a simple series resonant circuit containing inductance L and capacitance C, in which the value of one of the components, for example the capacitance, is varying in time. The "natural frequency" of such a circuit means the value (in radians per second) of $$\frac{1}{\sqrt{LC}}$$

More generally, the "natural frequency" at a given moment of a resonant circuit having a reactance element which is varying in time means the resonant frequency which that circuit would have at that moment if the reactance element were of fixed rather than of varying value.

The scale of time upon which a variation of parameter is carried out is of crucial importance in determining the behavior of the system, and the effect of the time scale is conveniently described in terms of the frequency spectrum of the variation of the time-varying parameter. If the spectrum contains appreciable components at frequencies greater than the lowest natural frequency reached in the resonant system, that is, if the time variation of the parameter is so rapid that the parameter changes value markedly during one cycle of oscillation, then the energy content of the system at a certain time may be dependent not only on the value of the parameter at that time but also on the past history of its variation. In other words, the exact nature of the spectrum, and in particular its higher-frequency components are then important in determining the flow of energy. If the time variation is in addition periodic, work may be done during every cycle of oscillation.

In prior parametric amplifiers and oscillators, the variable parameter typically goes through its cycle in less than one cycle of the oscillation.

In my proposed system, in certain embodiments, the time variation is sufficiently slow that only a relatively small change in the parameter occurs during one cycle of oscillation. As a result (in contrast to the action in systems of the type described above) the energy of a sufficiently non-dissipative system constructed as described herein depends mainly on the natural frequency at a given time, and very little on its past history. Under these circumstances the energy tends to be proportional to the natural frequency. Illustrative embodiments of the present invention operate upon this principle and are useful for converting energy at low frequency into energy at high frequency. One of the differences between such a proposed system and the class of parametric devices mentioned previously is that in the proposed system the output frequency is generally greater than that of any input to the system, and may in fact be several times as great.

A feature of the invention is a source of microwave power requiring only solid state components and involving no electron stream contained in a vacuum.

The invention has application as a power or energy multiplier or amplifier and as a harmonic multiplier or generator.

Other objects, features and advantages will appear from the following more detailed description of illustrative embodiments of the invention, which will now be given in conjunction with the accompanying drawings.

Figure 1:
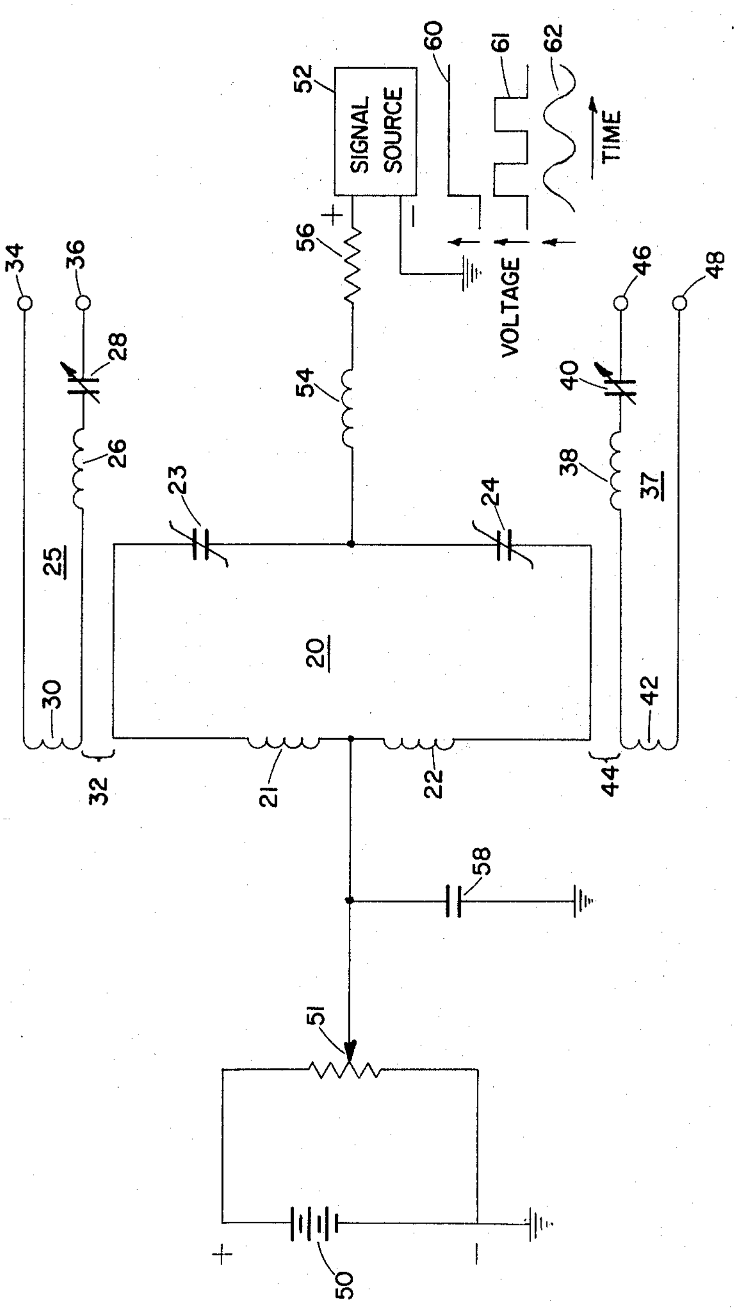
FIG. 1 is a schematic diagram of an illustrative embodiment of the invention.

In an embodiment useful for frequencies for which lumped circuit elements may be employed, including, for example, frequencies in the range extending from one to ten megacycles per second and higher, the resonant system comprises a series circuit containing one or more lumped inductance devices having inductance L and resistance R, together with one or more lumped capacitive elements of variable capacitance C. The capacitive element may be a silicon p-n junction diode and the inductance may be an ordinary radio frequency coil. A p-n junction diode has the property that its capacitance depends upon the voltage impressed between its terminals, and so constitutes a variable capacitor. A signal source is connected to apply a variable biasing voltage to the diode in the reverse direction, that is, opposite to the direction which makes the diode conductive. This variable biasing voltage may, for example, be derived from a source of a substantially rectangular voltage or may comprise a voltage having a sinusoidal component plus a D.C. component. By means of a fixed biasing voltage, for example in the conductive direction, the diode may be given a desired initial value of capacitance. Such a diode is capable of executing rapid variations in capacitance in response to the variable biasing voltage. The diode exhibits the best properties as a variable capacitor when biased in the reverse direction. An increase of bias in the reverse direction serves to decrease the capacitance of the diode, thereby increasing the natural frequency of the resonant circuit. The rate of change of the biasing voltage applied to the diode is controlled so as to control the rate of change of the natural frequency of the circuit.

Input and output circuits may be coupled inductively with the resonant circuit containing the bias-controlled variable capacitance element or elements. This resonant circuit is biased initially to resonate at the frequency to which the input circuit is tuned, or in some cases at a somewhat lower frequency. Input power is applied to the input circuit at the frequency to which it is tuned. The bias may then be gradually changed during the course of a few cycles of the input frequency until the resonant circuit becomes resonant to the frequency to which the output circuit is tuned, and in some cases may proceed until it is resonant at a somewhat higher frequency. With the input circuit energized at the start, the resonant circuit is energized by transfer of energy from the input circuit. As the natural frequency of the resonant circuit is changed, this circuit becomes detuned with respect to the input circuit, but the resonant circuit continues to oscillate, gradually increasing its frequency. Finally, it becomes tuned with respect to the output circuit, and the output circuit is energized by transfer of energy from the resonant circuit. The energy of the output circuit may become greater than the energy of the input circuit, whereby the apparatus serves to provide an output wave having increased frequency and power as compared with the input wave.

FIG. 1 shows a system of the above described type having a resonant circuit 20 comprising a serial combination of mutually coupled inductance coils 21, 22 and silicon p–n junction diodes 23 and 24. These diodes are poled so that their preferred direction of conventional current flow is downward for diode 23 and upward for diode 24 (similar to the arrangement of diodes 126 and 128 in FIG. 3). An input circuit 25 is provided comprising an inductance coil 26, a tuning condenser 28 and a coupling coil 30, the latter coupled to the circuit 20 magnetically as indicated schematically by the bracket 32 between coils 21 and 30. The circuit 25 is connected to a pair of input terminals 34, 36. An output circuit 37 is shown including an inductance coil 38, a tuning condenser 40 and a coupling coil 42 magnetically coupled to the coil 22 as indicated schematically by the bracket 44 between coils 22 and 42. The circuit 37 is provided with output terminals 46, 48.

Biasing means for controlling the capacitance of the diodes 23, 24, are provided, including a battery or D.-C. voltage supply 50 and potentiometer 51 adjustable to give a suitable initial bias to tune the circuit 20 to the resonant frequency of the input circuit 25. Opposed to the initial bias there is connected a source 52 of a voltage sufficient to change the capacitances of the diodes to the required extent to make the circuit 20 resonant to the resonant frequency of the output circuit 37. In certain embodiments, as will be explained, this voltage may be of rectangular wave form, or it may include a sinusoidal component. However, it may be helpful initially to consider it as a step voltage. To provide a gradual change in the tuning of the circuit 20 in response to the application of the voltage step, an inductor 54 and a resistor 56 are connected in series with source 52. A capacitor 58 is provided as a filter element for keeping oscillations of the circuit 20 out of the biasing circuits. A graph of the wave form of the voltage step is shown at 60.

It should be understood that the biasing battery 50 and the potentiometer 51 are illustrative and in some embodiments may be omitted; thus in some embodiments the coils or inductors 21 and 22 may be adjustable (physically adjustable, as by a movable core, or electrically variable, as in the case of saturable reactors), and the function of initially tuning the circuit 20 to the resonant frequency of the input circuit 25 may be achieved by adjusting the inductance of these coils 21 and 22, and omitting the bias means 50 and 51. Alternatively, this tuning may be achieved with the aid of an adjustable capacitor in parallel with the series combination of the diodes 23 and 24.

In the operation of the system of FIG. 1, the diodes 23, 24 have the property that the incremental capacitance of the element depends on the voltage applied to it, and so the element constitutes a rapidly variable capacitor. The voltage step function or rectangular wave from the source 52 is used, together with the inductor 54 and resistor 56, to generate a wave having a sloping leading edge, to be applied to the diodes in the reverse or nonconductive direction, which produces a decrease in capacitance resulting in an increase in the natural frequency of the circuit 20. The inductor 54 and resistor 56 serve to slow down the rise of the pulse or wave from the source so that it takes several cycles of the input frequency for the capacitance of the diodes to change from the initial value to the final value. The initial bias from the potentiometer 51 is used to give a slight initial bias to the diodes in the conductive direction, which increases their initial capacitance somewhat and enables a larger ratio between initial and final capacitances to be obtained. A limit to the overall capacitance ratio is set by incipient shunt conduction in the diodes, resulting either from normal forward conduction or from reverse current breakdown.

The push-pull arrangement of the resonant circuit, using two diodes, is advantageous as it facilitates keeping the alternating currents out of the step source 52 and the step voltage out of the output and input circuits 25, 37. The push-pull arrangement also causes the circuit to behave in a more linear fashion with respect to currents circulating through the coils 21 and 22 and the diodes 23 and 24, particularly provided the diodes are of the abrupt p–n junction type.

Before the rising voltage is applied to the diodes, an input at the resonant frequency of the input circuit is applied to the input circuit for a sufficiently long time to bring the circuit 20, which is tuned to the input frequency, up to full amplitude of oscillations. Then the step voltage is applied from the source 52. Over the course of several cycles of the input frequency, the rising voltage gradually raises the natural frequency of circuit 20 from the input frequency up to the output freqency. The circuit 20 continues to oscillate at increasing amplitude while gradually increasing its frequency as the natural frequency of the circuit 20 increases. When the output frequency is reached, the energy of the circuit 20 becomes coupled to the output circuit and the energy is transferred to the output circuit. In accordance with the qantum theory, the amount of energy in the circuit 20 increases in proportion to the natural frequency, so that the amount of energy delivered to the output circuit is greater than the amount of energy supplied by the input circuit. The increase in energy content of the resonant circuit comes from work done upon the diodes by the voltage step source 52 in changing the capacitance of the diodes.

Illustrative values of circuit elements for a system according to FIG. 1 are given in Table I for an input frequency of about five megacycles per second and an output frequency of about eight megacycles per second.

TABLE I

| Element: | | Value |
|---|---|---|
| Inductance coil 21 | microhenries | 4 |
| Inductance coil 22 | do | 4 |
| Inductor 54 | do | 100 |
| Resistor 56 | ohms | 1000 |
| Battery 50 | volts | 3 |
| Potentiometer 51 | ohms | 2000 |
| Capacitor 58 | microfarad | 0.01 |

In the illustrative case, the source 52 provides a six volt step wave or a rectangular wave. The rectangular wave typically will not be symmetrical; that is, the length of time at its maximum value will be shorter or in some cases longer than its time at its minimum value. The input and output circuits are tuned to five megacycles per second and eight megacycles per second respectively. It requires about five cycles at the input frequency for the capacitance of the diodes to change from the initial value to the final value.

In embodiments in which the signal source 52 provides a sinusoidal component plus a D.-C. component, or provides a rectangular wave, the relative mangitudes of the various voltages typically should be such that the net voltage applied to the diodes (considering not only the voltage from the source 52 but also any voltage from the elements 50 and 51) varies between a first value near zero and a second value at which the diodes are biased in the reverse direction.

The variation of the voltage applied to the diodes should be adapted to vary the natural frequency at a rate sufficiently slow that during one cycle of the oscillation the incremental change in frequency is small compared to the natural frequency existing at that point of the cycle.

In order to obtain amplification, the variation of the natural frequency should, however, not be so slow that energy is dissipated in the circuit as fast as, or faster than, it is introduced from the signal source which is varying the reactance element or elements.

If the output circuit is not dissipative, but sharply resonant, the energy at the output frequency will, in general, be transferred back and forth a number of times between the resonant circuit and the output circuit as between any pair of synchronous over-coupled circuits. At a time when all the energy is in the output circuit the circuit 20 may be returned to its original state, as by removing the voltage step, or by allowing the rectangular wave voltage to drop back to its initial value, so that the two circuits are no longer synchronous and return of the energy to circuit 20 is blocked. Thus the energy will be trapped in the output circuit.

In embodiments in which the source 52 is a rectangular wave generator, it preferably includes manually operable controls to adjust, independently, the duration of the maximum portion of the rectangular wave and also the duration of its minimum portion. (Note that the repetition frequency, being determined by the duration of a complete cycle, is determined by these adjustments of the duration of these two portions of the cycle.)

Suitable signal generators which may be used as the signal source 52 are commercially available. For example, apparatus capable of providing the various waveforms described herein, is sold commercially by numerous manufacturers, including, for example, Tektronix Inc.

One way of adjusting the apparatus of FIG. 1 is to couple an instrument for detecting the magnitude of the output power at the desired output frequency to the output terminals 46 and 48 and to adjust the duration of the maximum and minimum portions of the rectangular wave from the source 52 until maximum output power is obtained.

Figure 2:
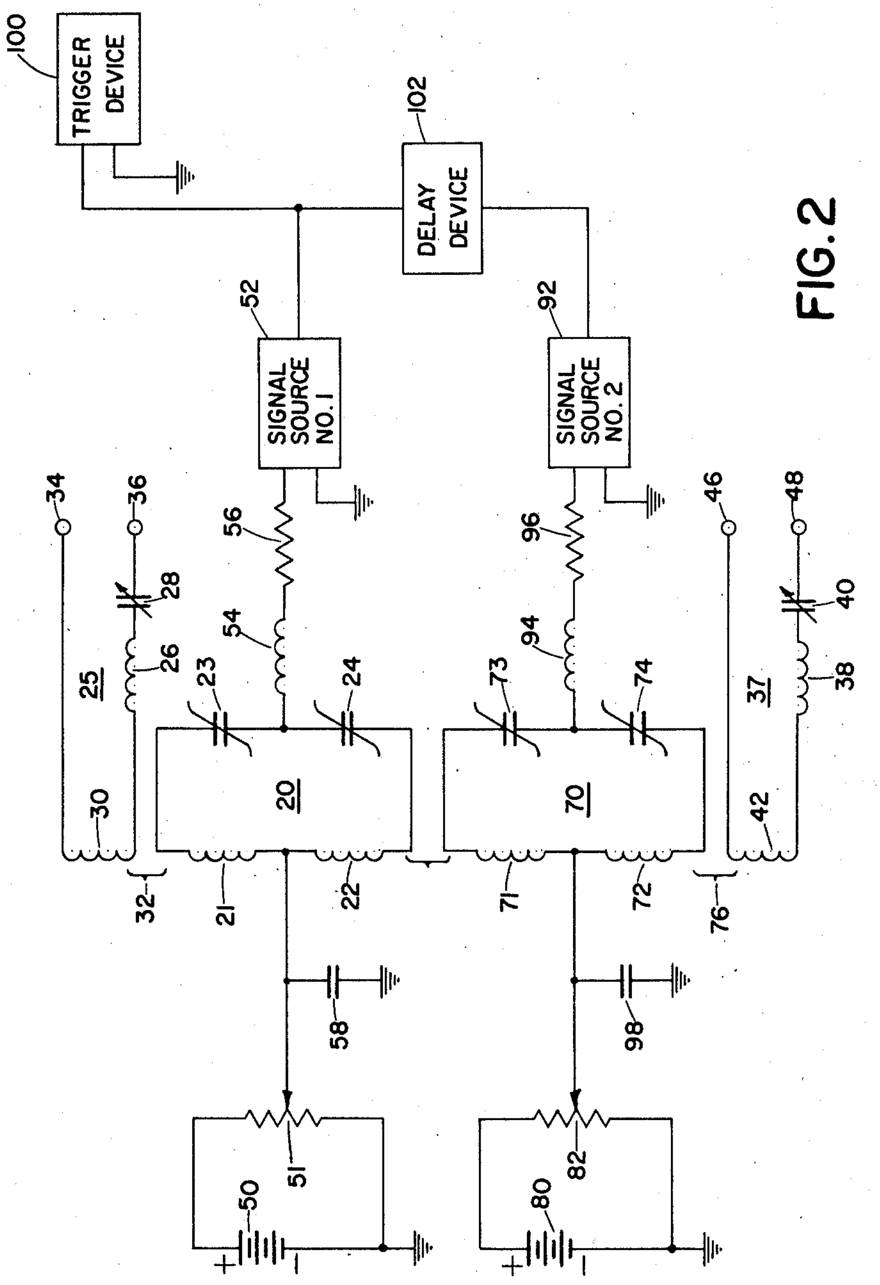
FIG. 2 is a schematic diagram of a cascaded arrangement employing two stages each of which stage is similar to the system shown in FIG. 1.

As will be more fully explained in the subsequent description of FIG. 2, a cascading effect may be obtained by substituting for the output circuit 37 another circuit of variable natural frequency like circuit 20 and applying the principle of variation of reactance so as to increase frequency to the second variable resonant circuit, and so on, using a plurality of variable resonant circuits. In this arrangement, a second operation is begun at a time when all the energy is stored in the second circuit. The first circuit may then be lowered in natural frequency and then the second circuit may be raised in frequency. A like result may be obtained by raising the natural frequency of the second circuit before that of the first circuit is lowered, or by altering both circuits simultaneously.

Also, the single stage circuit of FIG. 1 may be repeatedly varied to obtain an increase of energy during each cycle. This effect is obtained when the step voltage waveform 60 is replaced by the rectangular waveform 61 by means of which the circuit 20 is alternately raised and lowered in natural frequency. At high frequencies of capacitance change, the sinusoidal wave 62 may be used. That is, in some embodiments, the source 52 may provide a voltage having a sinusoidal component plus a D.-C. component of such polarity and magnitude as to drive the diodes in the reverse or non-conductive direction, but to avoid driving them far into the conductive condition. The frequency of this voltage and its amplitude should be adjusted to provide maximum power at the output terminals 46 and 48.

Band pass filters may be used instead of simple resonant circuits for the input and output circuits. The circuit 20 will then be coupled to the input circuit only briefly when the bias voltage is such that the tuning is correct within certain limits. The same is true with respect to the coupling between the circuit 20 and the output circuit. Coupling will automatically become effective at the proper instants to insure energy transfer from input to output with energy increase during each cycle.

It will therefore be seen that there has been described above an illustrative embodiment of a novel and economical circuit for increasing frequency and power.

It may be helpful here to refer further to the meanings of the terms "resonant frequency" and "natural frequency." The term natural frequency has been previously defined. When the natural frequency of a circuit is varied periodically in time at frequency $f_0$ as by varying the inductance or capacitance, the response of the circuit to a sinusoidal input wave of frequency $f_s$ which excites oscillations in the circuit is much more complicated than that of a circuit with fixed natural frequency. Instead of a single small range of frequency over which the phenomena of resonance (e.g. selective frequency response and energy storage) may be excited, there exist for time-varying circuits a number of such resonances occurring at a set of frequencies which are termed "resonant frequencies." These frequencies are separated by, but are not necessarily equal to, integral multiples of $f_0$. In general, one particular component may be found near the minimum value of the natural frequency and another particular component may be found near the maximum value of the natural frequency, which components when chosen as the input frequency $f_1$ and output frequency $f_2$, respectively, will give the most advantageous operation.

*Harmonic generator*

The system of FIG. 1 may be operated as a generator of harmonics of the frequency $f_0$ at which the natural frequency of the circuit 20 is varied, and, in fact, as a generator of harmonics, for example harmonics of the half-frequency $\frac{1}{2}f_0$. In this mode of operation, the diodes 23, 24 have their capacitance varied by a sine wave signal at the frequency $f_0$ supplied from a generator acting as the signal source 52. Because of the pronounced non-linear behavior of the diodes, the time-variation of capacitance of the diodes contains frequency components of integral multiples of $f_0$ up to quite large multiples, even though the current thus produced through the diodes may not. It is found that such a time-varying capacitance can exhibit a negative input conductance, for example at any frequency which is one-half of a frequency at which the diode has a component of capacitance variation. Accordingly, negative input conductance may occur at any frequency which is an integral multiple of $\frac{1}{2}f_0$.

In order to provide internally generated oscillations, the following conditions should be provided: (*a*) one or more of the resonant frequencies of the circuit 20 should coincide with integral multiples of some base frequency which is itself a rational fraction of or equal to $f_0$, for example, in the case of harmonics of half-integral order, $\frac{1}{2}f_0$, (*b*) the time variation of capacitance of the diodes should contain frequency components up to frequencies of the order of magnitude of twice the lowest natural frequency reached by the circuit, and (*c*) the natural power losses should be small enough so that they do not prevent such oscillations.

Internal oscillations so generated are clearly as good as an external input, so that no external input is then needed, and the input circuit 25 may be omitted in the particular embodiment presently under discussion, namely the harmonic generator. In the presence of the internally generated oscillations, power may be taken from the circuit 20 by way of the output circuit 37 at the frequency $f_2$, provided that frequency is also an integral multiple of the frequency $\frac{1}{2}f_0$. This is true even though the component of capacitance at frequency $2f_2$ may be much too weak to excite parametric oscillations directly.

In one embodiment of a harmonic generator with a capacitance variation at one megacycle per second, a harmonic output at 17 megacycles per second was readily obtained with a power loss of only 23 decibles, which is an improvement over the performance of conventional passive harmonic generators.

*Figure 2*

FIG. 2 shows a combination of two systems each similar to the one shown in FIG. 1 but having different initial natural frequencies. The input circuit 25 is coupled to the resonant circuit 20 as in FIG. 1, but the output circuit 37 instead of being directly coupled to the circuit 20 is coupled thereto by way of mutual inductance with a second resonant circuit 70 comprising a serial combination of mutually coupled inductance coils 71, 72, and silicon p-n junctions 73 and 74, the circuit 70 being coupled to the circuit 20 as indicated by the bracket in the drawing. The coupling coil 42 of the output circuit 37 is magnetically coupled to the coil 72 of the circuit 70 as indicated schematically by the bracket 76. Biasing means for controlling the capacitance of the diodes 73, 74 are provided, including a battery 80 and potentiometer 82 adjustable to give a suitable initial bias to tune the circuit 70 to a value near the highest natural frequency in the range of frequency variation of the circuit 20 as controlled by the signal source 52, which in this arrangement is referred to as signal source number 1. A similar signal source 92 is provided for controlling the variation of the natural frequency of circuit 70, this signal source being referred to as signal source number 2. To provide the necessary gradual change in the tuning of circuit 70, in response to the application of a voltage step from signal source number 2, an inductor 94 and a resistor 96 are connected in series with source 92. A capacitor 98 is provided as a filter element for keeping oscillations of the circuit 70 out of the biasing circuit 80, 82.

In the circuit of FIG. 2, the signal sources 52 and 92 are arranged to be triggered into action by a signal from a trigger device or pulse generator 100, which latter device is connected directly to signal source number 1 and through a delay device 102 to the signal source number 2. The delay device may, for example, comprise a delay line.

In the operation of the system of FIG. 2, a cascading effect of the kind previously mentioned is obtained by first triggering signal source number 1, and, after a suitable time delay, triggering signal source number 2. Resonant circuit 20 is initially resonant to a given frequency $f_1$ by virtue of the initial bias applied thereto by the biasing circuit 50, 51. Resonant circuit 70 is initially resonant to a frequency $f_2$, higher than $f_1$, by virtue of the initial bias applied thereto by the biasing circuit 80, 82. The input circuit is tuned to frequency $f_1$ and the output circuit 37 is tuned to a third frequency $f_3$, higher than $f_2$. When signal source number 1 is triggered, the natural frequency of circuit 20 begins to undergo a gradual transition from $f_1$ to a value near to or greater than $f_2$. At the beginning of this transition, it will be assumed that the input circuit has already excited circuit 20 into forced oscillations of full amplitude at frequency $f_1$. As the transition progresses, the circuit 20 becomes detuned with respect to the input circuit but continues to oscillate at gradually increasing frequency. When the frequency of circuit 20 has increased to the value near $f_2$, circuit 20 becomes attuned to circuit 70. No further change need occur in the frequency of circuit 20 at this time. Oscillation energy then surges back and forth between circuits 20 and 70.

The time rate of surge between the circuits depends upon the degree of coupling between the circuits, the surging becoming more rapid as the coupling is made more perfect. By using a moderate degree of coupling, still in excess of the critical coupling, the surge may be made relatively slow and may be determined at a value for which the period of surge is relatively long compared to the time required to vary the frequency of either circuit 20 or circuit 70 over the entire range of frequency variation. By selecting a suitable amount of delay in the delay device 102, the start of the frequency variation in circuit 70 is delayed until such a time that substantially all the oscillation energy has passed from circuit 20 to circuit 70. The frequency variation of the circuit 70, under the control of its signal source, begins before the energy begins to surge back into circuit 20. The natural frequency of circuit 70 is then varied by means of signal source number 2 gradually over the range from $f_2$ to $f_3$. When the frequency $f_3$ is established in circuit 70 the oscillatory energy in circuit 70 will begin to surge into the output circuit 37, resulting in an output which is higher in frequency than the input in circuit 25 and may be increased in energy content. Advantage may be taken of the output either as a source of a higher frequency or as a means of amplifying the energy of oscillation, or both.

Instead of cascading only two circuits, such as 20 and 70, one may in some cases advantageously cascade three or more such circuits in like manner.

Figure 3:
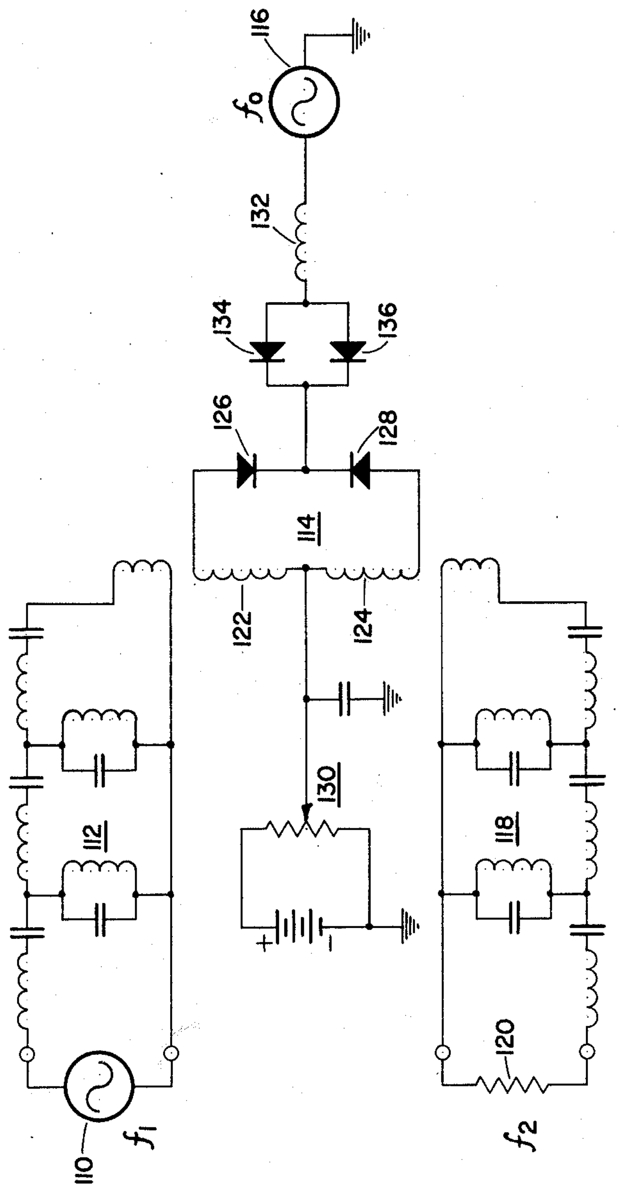
FIG. 3 is a schematic diagram of an arrangement alternative to that shown in FIG. 1.

With respect to circuits of the types shown in FIGS. 1, 2 and 3, the values of the various frequencies referred to should be so chosen that the frequency difference between the input frequency and the output frequency is an exact integral multiple of the frequency $f_0$ at which the natural frequency of the resonant circuit or circuits is varied.

*Figure 3*

FIG. 3 shows a source 110 of frequency $f_1$ connected through an input band pass filter 112 of midband frequency $f_1$ to a resonant circuit 114. A source 116 of signal frequency $f_0$ is provided for varying the natural frequency of the circuit 114 over a frequency range having a lower value which may be $f_1$ or which may be lower than or slightly above $f_1$, to a higher frequency $f_2$ and back continuously at the frequency $f_0$. It will be understood that the source 116, like source 52 in FIG. 1 or 2, may include a D.-C. component as well as a sinusoidal component. The circuit 114 is also coupled to an output band pass filter 118, which latter is terminated in any suitable utilization circuit, represented schematically in the figure by a resistor 120. The midband frequency of filter 118 may be $f_2$ or may be lower or slightly higher than that value. The circuit 114 comprises coupled inductance coils 122 and 124 serially connected with variable capacitance elements schematically represented by diodes 126 and 128 connected in the respective polarities indicated by the direction of the arrow head in the conventional symbol for a diode. There may be provided a biasing circuit 130, connected as shown.

The net effect of the various voltages applied to the diodes 126 and 128 is that the voltage across them varies from approximately zero or a small value in the conducting direction to a large value in the non-conducting direction.

In the light of the explanation in connection with FIG. 1 of how the biasing battery and potentiometer could be omitted provided certain other alternatives were employed for tuning the circuit 20, it will be understood that the biasing batteries and potentiometers in FIGS.

2 and 3 may also be omitted in certain embodiments provided their circuits 20, 70 and 114, respectively, are tuned by other means, as for example by varying their inductance elements.

It will be understood that when the biasing battery and potentiometer 130 are omitted, they are replaced by a connection to ground, so as to complete the circuit back to the source 116. Similar connections are employed when similar modifications are made in the circuits of the other figures.

In FIG. 3, the source 116 is connected to the circuit 114 through an inductor 132 and a pair of parallel connected diodes 134, 136. The diodes 126, 128, 134 and 136 are preferably substantially identical in electrical characteristics, and the diodes 134 and 136 are connected in relative polarity with respect to diodes 126 and 128 as indicated in the drawing by the conventional diode symbols. Instead of using the two diodes 134 and 136, it is possible, alternatively to use a single diode electrically equivalent to the two in parallel.

In the operation of the system of FIG. 3, an electromotive force varying substantially at the frequency $f_0$ is impressed upon the circuit 114 by the source 116, thereby varying the capacitance of the diodes 126, 128 periodically over a range of values and consequently varying the natural frequency of the circuit 114. The system is so adjusted that the range of frequency variation in circuit 114 covers the frequency interval from the previously mentioned lower value to $f_2$. When the natural frequency of the circuit 114 goes into a region close to the frequency $f_1$, the filter 112 transmits energy at frequency $f_1$ from the source 110 to circuit 114, thereby building up strong oscillations in that circuit. As the natural frequency of circuit 114 increases, circuit 114 becomes detuned from frequency $f_1$ so that source 110 is effectively disconnected from circuit 114. Oscillations continue, however, in circuit 114 and change in frequency as the natural frequency of the circuit changes. When the natural frequency of circuit 114 become $f_2$, energy is transmitted through filter 118 to the utilization circuit 120. Substantially all the energy of circuit 114 leaves that circuit while the natural frequency is $f_2$. Thereafter, as the natural frequency of circuit 114 gradually returns to $f_1$, the system is inactive, but when that frequency is reached the cycle begins over again.

Negative input conductance and self-excited oscillations tend to occur under the conditions described and explained above in connection with the harmonic generator.

The output filter 118 is generally necessary to insure that the output is restricted to a single frequency, while the input filter 112 should be used when source 110 is connected, to insure that power at frequencies other than $f_1$ is not dissipated in the source impedance and thus wasted.

The inductor 132 and the diodes 126 and 128 are usefully connected as shown in the circuit of the signal source 116 to avoid or eliminate non-linear resonance phenomena in the drive circuit. The diodes 134, 136 are substantially identical with diodes 126, 128 and oppositely poled with respect to the circuit of the source 116. The inductance value of inductor 132 should be made such as to resonate with the average capacitance value in the circuit at the drive frequency $f_0$, thereby minimizing currents of higher or lower frequencies while freely passing the frequency $f_0$ and presenting to the generator 116 an optimum load.

The diodes 134 and 136 also aid the biasing action. They allow the diodes 126 and 128 to have a self-biasing action. The diodes 134 and 136 may, in a modified arrangement, be replaced by a capacitor, in series with the inductor 132. Such an arrangement also allows the diodes 126 and 128 to have a self-biasing action.

The diodes 134 and 136 may also be omitted altogether and replaced by a direct connection. In this case the biasing circuit 130 and the generator 116 should provide voltages of such polarity and magnitude that the voltage across the diodes varies from approximately zero or a small value in the conducting direction to a large value in the non-conducting direction.

It will therefore be seen that there has been described in connection with FIGURE 3 another novel form of circuit for increasing frequency and power, including among other advantages particularly efficient means for coupling power from the generator 116 into the circuit.

Although certain illustrative embodiments may employ lumped circuit elements, the invention is not, in its broadest aspect, so limited; thus, for example, instead of employing inductance coils as illustrated (such as the coils 21, 22, 71, 72, 122, and 124 of FIGS. 1–3), these coils may be replaced by inductor elements of the distributed type, such for example as a length of coaxial cable, waveguide, stripline, microstrip, or other transmission line of appropriate length and termination to present the required inductive impedance.

Examples of other resonant systems which differ in some respects from those described above, but in which the natural frequency may be varied by means of a variable parameter are: a lumped constant circuit including a non-linear capacitor employing a ferro-electric dielectric material controlled by a control voltage, or including a non-linear or saturable inductor employing a high-frequency ferro-magnetic material such as a ferrite or a thin metallic film controlled for example by a control current in a control coil; a cavity resonator or transmission line resonator filled or partially filled with a ferroelectric or ferromagnetic substance, whose differential permittivity or permeability can be changed by means of an externally applied electric or magnetic field; or a hollow resonant system into which may be variably injected a plasma to change the natural frequency of the system, or in which a semi-conductor contained within the system may have its impurities ionized for like purpose.

Still further examples include a lumped-constant transmission line the electrical length of which may be decreased and increased by varying the reactive elements composing the line.

It will be understood, in the light of the above description, that any of the above mentioned types of resonant systems may be substituted for the resonant system shown in FIGS. 1, 2 and 3 and that suitable means appropriate to the type of resonant system substituted may be used in place of the signal sources shown in these figures for varying the natural frequency of the resonant system.

In the preceding description of various novel circuits, I have referred to certain modes of operation and apparatus for varying the reactance of one or more of the elements slowly. It is possible to modify the embodiments and modes of operation so as to increase frequency and power but so as to enable the variation of the reactance to proceed more rapidly while insuring that the energy is determined by the instantaneous value of the natural frequency rather than its past variation. This may be accomplished by simultaneously varying the capacitive element and the inductive element in such a way as to maintain $L/C$ (the ratio of inductance to capacitance) substantially constant. Thus, to increase the frequency, both the inductance and the capacitance are decreased, by equal percentages. The circuit of FIG. 1 may, in this modified arrangement, employ, as the inductors 21 and 22, inductors of the type controllable by an applied voltage or current signal, which may be derived from the signal source 52, for example, saturable inductors such as those referred to above. The signal for controlling the capacitance elements (the diodes) and the signal for controlling the inductance elements are correlated to cause the capacitance and the inductance to change in the same sense (that is, both decrease or both increase at a given time), so as to maintain the ratio $L/C$ substantially constant.

With respect to the various systems which have been described herein, including FIGS. 1, 2 and 3, it may be further explained that if internally generated oscillations are not desired, the various frequencies should be so chosen that the resonant frequencies of the circuit are not related to the frequency $f_0$ by any simple numerical relationship; in particular, the resonant frequencies should not be integral multiples of $\frac{1}{2}f_0$.

In certain of the embodiments which have been described, the operation of the system is more or less discontinuous; for example when a step voltage is employed or a rectangular wave of low repetition frequency the rate of repetition may be of negligible importance. In this case, advantage may be taken of the surging of energy between overcoupled circuits to transfer energy substantially exclusively in a preferred direction as herein described.

When, on the other hand, operation is continuous, for example when a sinusoidal reactance-varying wave of frequency $f_0$ is employed, and the circuits are over-coupled, energy urging may be controlled by selecting suitable relative values of $f_0$, $f_1$ and $f_2$ to obtain best operation.

While illustrative forms of apparatus and methods in accordance with the invention have been described and shown herein, it will be understood that numerous changes may be made without departing from the general principles and scope of the invention.

What is claimed is:

1. A frequency increaser and power amplifier comprising, in combination, a resonant circuit including an element of variable reactance, said resonant circuit having a natural frequency $f_1$ in the initial state of said variable reactance, means to vary the reactance of said variable reactance element from said initial state over a range whereby the resultant natural frequency of the circuit varies from said frequency $f_1$ to a materially higher frequency $f_2$, said reactance varying means being so adapted and designed as to require several cycles at said frequency $f_1$ to change the natural frequency from $f_1$ to $f_2$, input means selective substantially to frequency $f_1$ coupled to said resonant circuit, and output means selective substantially to frequency $f_2$ coupled to said resonant circuit, whereby input power at substantially frequency $f_1$ becomes amplified at substantially frequency $f_2$.

2. A frequency increaser and power amplifier comprising, in combination, a resonant circuit including an element of variable reactance, said resonant circuit having a natural frequency $f_1$ in the initial state of said variable reactance, means to vary the reactance of said variable reactance element from said initial state over a range whereby the resultant natural frequency of the circuit varies between said frequency $f_1$ and a materially higher frequency $f_2$, said reactance varying means being so adapted and designed as to require several cycles at said frequency $f_1$ to vary the natural frequency over the entire range between frequencies $f_1$ and $f_2$, input means selective to a frequency lying in the lower portion of said range, and output means selective to a frequency lying in the upper portion of said range, said input and output means both being coupled to said resonant circuit, whereby power impressed upon said input means is transmitted to said output amplified and increased in frequency.

3. A frequency increaser and power amplifier comprising, in combination, a resonant circuit including an inductance element and a semiconductor diode which exhibits a variable capacitance controllable by means of a variable voltage thereacross, said resonant circuit having a natural frequency $f_1$ in the initial state of said diode, whereby the natural frequency of the said resonant circuit may be varied over a range between said frequency $f_1$ and a materially higher frequency $f_2$, means to vary the voltage across said diode thereby to vary the capacitance of said diode and the resultant natural frequency throughout said range, said voltage varying means being so adapted and designed as to require several cycles at said frequency $f_1$ to vary the natural frequency over the entire said range, input means selective substantially to frequency $f_1$, and output means selective substantially to frequency $f_2$, said input and output means each being coupled to said resonant circuit, whereby power impressed upon said input means is amplified and appears at increased frequency in said output means.

4. A frequency increaser and power amplifier comprising, in combination, a resonant circuit including means providing an inductive reactance and a semiconductor device having a voltage-controlled variable-capacitance characteristic, said resonant circuit having a natural frequency $f_1$ in the initial state of said semiconductor device, means to apply a voltage to said latter device and to vary said voltage thereby to vary the capacitance of said device and the resultant natural frequency of said circuit throughout a range including said frequency $f_1$ and a materially higher frequency $f_2$, said voltage varying means being adapted to vary said natural frequency at such a rate that during one cycle of said natural frequency the incremental change in frequency is small compared to the natural frequency existing at the beginning of said cycle, frequency-selective input means, and frequency-selective output means, said input and output means each being coupled to said resonant circuit, whereby power impressed upon said input means is amplified and appears at increased frequency in said output means.

5. A frequency increaser and power amplifier comprising, in combination, a resonant circuit including an inductor, and a semiconductor diode which exhibits a variable capacitance controllable by means of a variable voltage thereacross, said resonant circuit having a natural frequency $f_1$ in the initial state of said diode, whereby the natural frequency of the said resonant circuit may be varied over a range of frequencies including that between said frequency $f_1$ and a materially higher frequency $f_2$, means to vary the current through said diode at a frequency $f_0$ which is low relatively to the frequency $f_1$ whereby the natural frequency of said resonant circuit is varied throughout a range including said frequencies $f_1$ and $f_2$, input means selective to frequency $f_1$, output means selective to frequency $f_2$, and means coupling said input means and said output means to said resonant circuit, whereby frequency increase and power amplification occur between said input means and said output means.

6. A frequency increaser comprising, in combination, a resonant circuit including an element of variable reactance and having a resultant natural frequency $f_1$ in the initial state of said variable reactance, alternating means operable at a frequency $f_0$ for varying the reactance of said variable reactance element over a range whereby the resultant natural frequency of said circuit varies through a range which includes said frequency $f_1$ and a materially higher frequency $f_2$, said frequencies $f_1$ and $f_2$ each being materially higher than said frequency $f_0$, input means selective to frequency $f_1$, and output means selective to frequency $f_2$, said input means and said output means each being coupled to said resonant circuit, whereby input power at frequency $f_1$ is transformed into output power at frequency $f_2$.

7. A harmonic generator of integral order comprising, in combination, a resonant circuit including an element of variable reactance and having a resultant natural frequency $f_1$ in the initial state of said variable reactance, driving means operable at a frequency $f_0$ for varying the reactance of said variable reactance element over a range whereby the resultant natural frequency of said circuit varies over a range including said frequency $f_1$ and a materially higher frequency $f_2$, said frequency $f_2$ being a first integral multiple of the frequency $f_0$ and the frequencies $f_1$ and $f_2$ differing by an amount which is a second integral multiple of the frequency $f_0$, said second multiple being less than said first multiple, means to sustain oscillations in said circuit at the frequency $f_1$, and output means selective to frequency $f_2$ coupled to said circuit, whereby driving the said element of variable reactance at frequency $f_0$ generates output oscillations at a frequency which is an integral multiple of frequency $f_0$.

8. A harmonic generator of half-integral order comprising, in combination, a resonant circuit including an element of variable reactance and having a resultant natural frequency $f_1$ in the initial state of said variable reactance, driving means operable at a frequency $f_0$ less than said frequency $f_1$ for varying the reactance of said variable reactance element over a range whereby the resultant natural frequency of said circuit varies over a range including that between said frequency $f_1$ and a materially higher frequency $f_2$, said frequency $f_2$ being a harmonic of the frequency $f_0$ of half-integral order, the frequencies $f_1$ and $f_2$ differing by an integral multiple of the frequency $f_0$, means to sustain oscillations in said circuit at the frequency $f_1$, and output means selective to the frequency $f_2$ coupled to said circuit, whereby driving the said element of variable reactance at the frequency $f_0$ results in the generation of output oscillations at the frequency $f_2$ which is a harmonic of the frequency $f_0$ of half-integral order.

9. In a frequency increaser, in combination, a balanced resonant circuit including two mutually coupled inductors and two variable capacitance diodes connected in series opposition, said resonant circuit having a natural frequency $f_1$ in the initial state of said diode alternating means operable at a frequency $f_0$ for varying the capacitance of said diodes over a range whereby the resultant natural frequency of said circuit varies between said frequency $f_1$ and a higher frequency $f_2$, said frequencies $f_1$ and $f_2$ each being materially higher than said frequency $f_0$, input and output circuits resonant respectively at least approximately to said frequencies $f_1$ and $f_2$ inductively coupled to said inductors in such relationship that transmission of oscillations may occur between said balance resonant circuit and said input and output circuits, and said alternating means operable at frequency $f_0$ being connected to said balanced resonant circuit in balanced relationship to said input and output circuits, thereby substantially preventing transmission of oscillations between said alternating means and said input and output circuits.

10. In a frequency increaser, in combination, a resonant circuit including two variable capacitance diodes connected in series opposition to each other, said resonant circuit having a natural frequency $f_1$ in the initial state of said diodes, alternating means operable at a frequency $f_0$ for varying the capacitance of said diodes over a range whereby the resultant natural frequency of said circuit varies between said frequency $f_1$ and a higher frequency $f_2$, said frequencies $f_1$ and $f_2$ each being materially higher than said frequency $f_0$, input and output circuits resonant respectively at least approximately to said frequencies $f_1$ and $f_2$ and coupled to said resonant circuit, two additional variable capacitance diodes connected in parallel aiding relationship to each other and in serial relationship to said means of frequency $f_0$, said serial combination of diodes and means of frequency $f_0$ being connected to said balanced resonant circuit in series opposing relationship to the said diodes in said resonant circuit, all four of said diodes being substantially identical in electrical properties, and inductive means in series with said means of frequency $f_0$ to effect substantial resonance at said frequency $f_0$ of said inductive means with the capacitative reactance in series with said means of frequency $f_0$, whereby transmission of oscillations from said balanced resonant circuit into said means of frequency $f_0$ is substantially prevented, and whereby to minimize undesired non-linear resonance phenomena.

11. A frequency increaser comprising, in combination, a resonant circuit including a plurality of elements of variable reactance, said resonant circuit having a natural frequency $f_1$ in the initial state of said elements of variable rectance, means operable at a frequency $f_0$ less than said frequency $f_1$ for simultaneously varying the reactance of each of said plurality of variable reactance elements over a range so as to cause the resultant natural frequency of said circuit to vary between said frequency $f_1$ and a materially higher frequency $f_2$, input means coupled to said resonant circuit for applying input power to it at substantially frequency $f_1$, and output means coupled to said resonant circuit, said output means including means selective to substantially frequency $f_2$, whereby input power applied through said input means at substantially frequency $f_1$ is transformed into output power appearing in said output means at substantially frequency $f_2$.

12. A frequency increaser and power amplifier comprising, in combination, a first resonant circuit including a first element of variable reactance, said resonant circuit having a natural frequency $f_1$ in the initial state of said first element of variable reactance, first reactance varying means for varying the reactance of said first element of variable reactance over a range whereby the resultant natural frequency of the circuit varies through a range including that from said frequency $f_1$ to a materially higher frequency $f_2$, said reactance varying means being adapted as to require several cycles at said frequency $f_1$ to change the resonant frequency for $f_1$ to $f_2$, a second resonant circuit coupled to said first resonant circuit and including a second element of variable reactance, said second resonant circuit having a natural frequency $f_2$ in the initial state of said second element of variable rectance, second reactance varying means for varying the reactance of said second element of variable reactance over a range whereby the resultant natural frequency of the circuit varies through a range including approximately that from the frequency $f_2$ to a materially still higher frequency $f_3$, said second reactance varying means being so adapted and designed as to require several cycles at said frequency $f_2$ to change the resonant frequency of said second resonant circuit from $f_2$ to $f_3$, input means for energizing said first resonant circuit at substantially the frequency $f_1$, output means selective to substantially said frequency $f_3$ coupled to said second resonant circuit, individual activating means for said first and second reactance varying means, a delay device, and energizing means connected directly to said activating means for said first reactance varying means and by way of said delay device to said activating means for said second reactance varying means, whereby energy impressed at substantially frequency $f_1$ upon said first resonant circuit is converted into energy at substantially frequency $f_2$ and thereafter energy impressed at substantially frequency $f_2$ by said first resonant circuit upon said second resonant circuit is converted into energy at substantially frequency $f_3$ and impressed upon said output circuit.

13. In a frequency increaser, in combination, a resonant circuit including an element of variable reactance, means operative during a first interval from a time $t_0$ to a time $t_1$ to vary the reactance of said variable reactance element over a range whereby the resultant natural frequency of the circuit varies from a frequency $f_1$ to a materially higher frequency $f_2$, said first interval being at least equal in length to several cycles at said frequency $f_1$, an output circuit in over-coupled relationship to said resonant circuit at said frequency $f_2$, means operative during a second interval from said time $t_1$ to a time $t_2$ said second interval being of sufficient length so that when the natural frequency of said resonant circuit has become equal to said frequency $f_2$ time is provided for energy from said resonant circuit to surge from said resonant circuit into said output circuit and said second interval ends before said energy begins to surge back from said output circuit to said resonant circuit, means operative during a third interval from said time $t_2$ to a time $t_3$ to vary the reactance of said variable reactance element back over said range whereby the resultant natural frequency of the circuit varies from said frequency $f_2$ to said frequency $f_1$, said third interval being at least equal in length to several cycles at said frequency $f_1$, and an input circuit in over-coupled relationship to said resonant circuit at said frequency $f_1$, and means operative during a fourth interval from said time $t_3$ to a time $t_4$ said fourth interval being of sufficient additional length so that when the natural frequency of said resonant circuit has again become equal to $f_1$ time is provided for energy in said input circuit to surge from said input circuit into said resonant circuit and said fourth interval ends before said energy begins to surge back from said resonant circuit to said input circuit, said elements being adapted to operate repetitively in succession in the above-mentioned order.

14. In a frequency changing system, in combination, a resonant circuit including an inductance coil and a semiconductor element having variable capacitance controllable by means of voltage variation across said semiconductor element, means to determine an initial value of voltage across said semiconductor element, whereby the resultant natural frequency of said resonant circuit has an initial value $f_1$, means to vary the voltage across said semiconductor element whereby the resultant natural frequency of said resonant circuit may be varied over a frequency range between said frequency $f_1$ and a materially higher frequency $f_2$, means to control the time rate of variation of said voltage varying means, whereby the said resultant natural frequency of said resonant circuit may be varied over said frequency range during a period of time equal to several cycles of said frequency $f_1$, means selective to substantially the frequency $f_1$ for exciting oscillations in said resonant circuit, and means selective to substantially the frequency $f_2$ for receiving oscillations from said resonant circuit at said frequency $f_2$.

15. In a frequency increaser, in combination, a resonant circuit including two variable capacitance diodes connected in series opposition to each other, said resonant circuit having a natural frequency $f_1$ in the initial state of said diodes, alternating means operable at a frequency $f_0$ for varying the capacitance of said diodes over a range whereby the resultant natural frequency of said circuit varies between said frequency $f_1$ and a higher frequency $f_2$, said frequencies $f_1$ and $f_2$ each being materially higher than said frequency $f_0$, input and output circuits resonant respectively at least approximately to said frequencies $f_1$ and $f_2$ and coupled to said resonant circuit, a third variable capacitance diode connected in serial relationship to said means of frequency $f_0$, the serial combination of said third diode and the means of frequency $f_0$ being connected to said balanced resonant circuit in series opposing relationship to the said first two diodes in said resonant circuit, and inductive means in series with said means of frequency $f_0$ to effect substantial resonance at said frequency $f_0$ of said inductive means with the capacitive reactance of said third diode in series with said means of frequency $f_0$, whereby transmission of oscillations from said balanced resonant circuit into said means of frequency $f_0$ is substantially prevented, and whereby undesired nonlinear resonances are minimized.

References Cited by the Examiner

UNITED STATES PATENTS

| | | | |
|---|---|---|---|
| 2,443,094 | 6/48 | Carlson et al. | 321—69 |
| 2,696,530 | 12/54 | Kerns | 321—69 |
| 2,951,207 | 8/60 | Hudspeth | 330—4.9 |
| 2,969,497 | 1/61 | Zen-Iti Kiyasu et al. | 321—69 |
| 3,048,783 | 8/62 | Warrent et al. | 330—4.5 |

OTHER REFERENCES

"A Low-Noise Wide-Band Reactance Amplifier," by B. Salzberg and E. W. Sard; published in Proceedings of the IRE—Correspondence (June 1958); page 1303 relied on.

"An Analysis of Four-Frequency Reactance Circuits" by D. K. Adams; published by IRE Translations on Microwave Theory & Techniques (May 1960).

LLOYD McCOLLUM, *Primary Examiner.*

SAMUEL BERNSTEIN, *Examiner.*